Feb. 2, 1932. LE ROY C. DAVIDGE ET AL 1,843,317
FILM DEVELOPING PROCESS AND APPARATUS THEREFOR
Filed Jan. 23, 1929 2 Sheets-Sheet 1
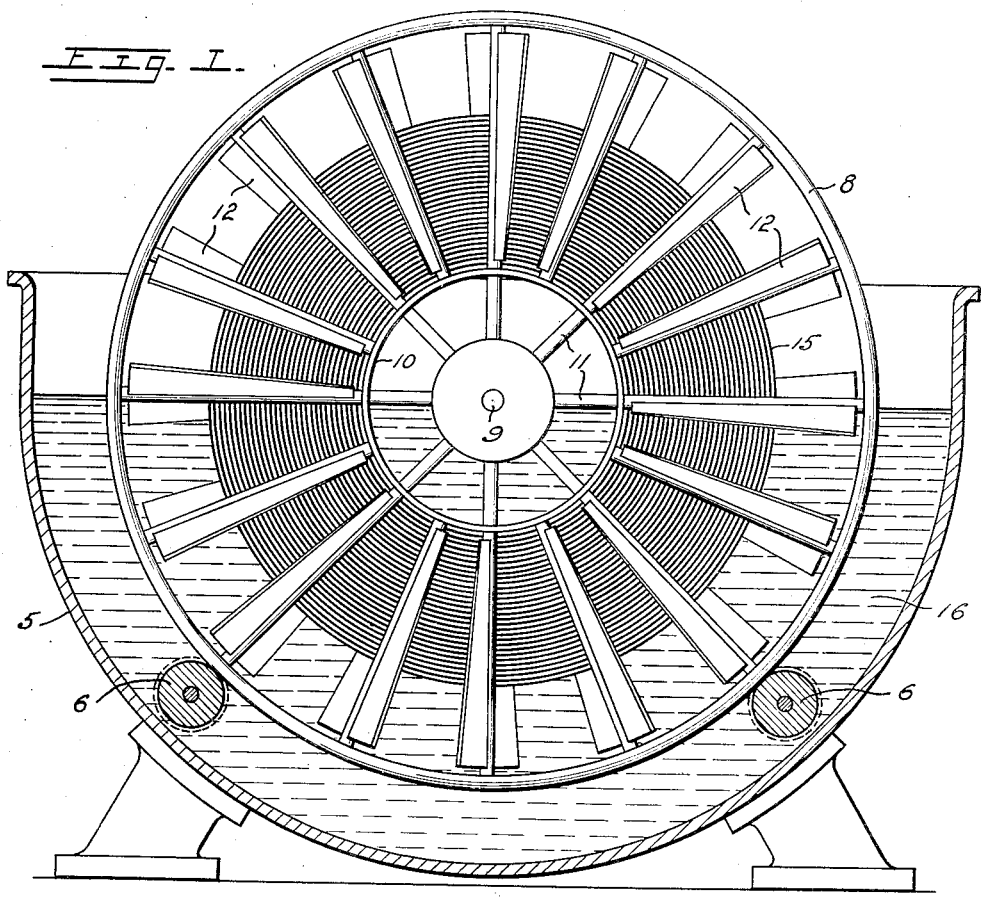
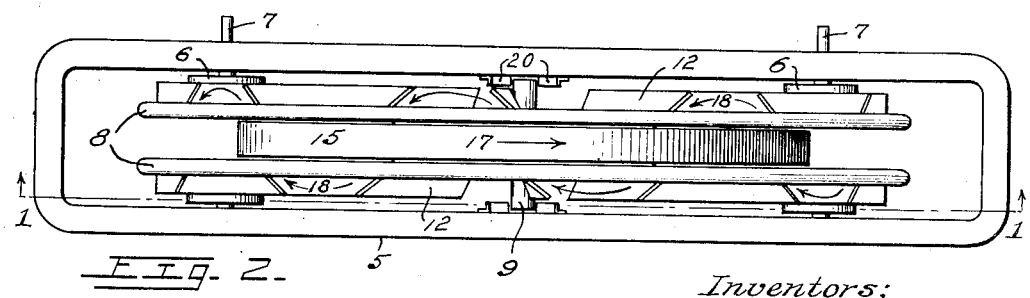
Inventors;
Le Roy C. Davidge, and
Arthur E. Reeves,
per Arthur J. Farnsworth,
their Attorney.

Feb. 2, 1932.  LE ROY C. DAVIDGE ET AL  1,843,317
FILM DEVELOPING PROCESS AND APPARATUS THEREFOR
Filed Jan. 23, 1929  2 Sheets-Sheet 2
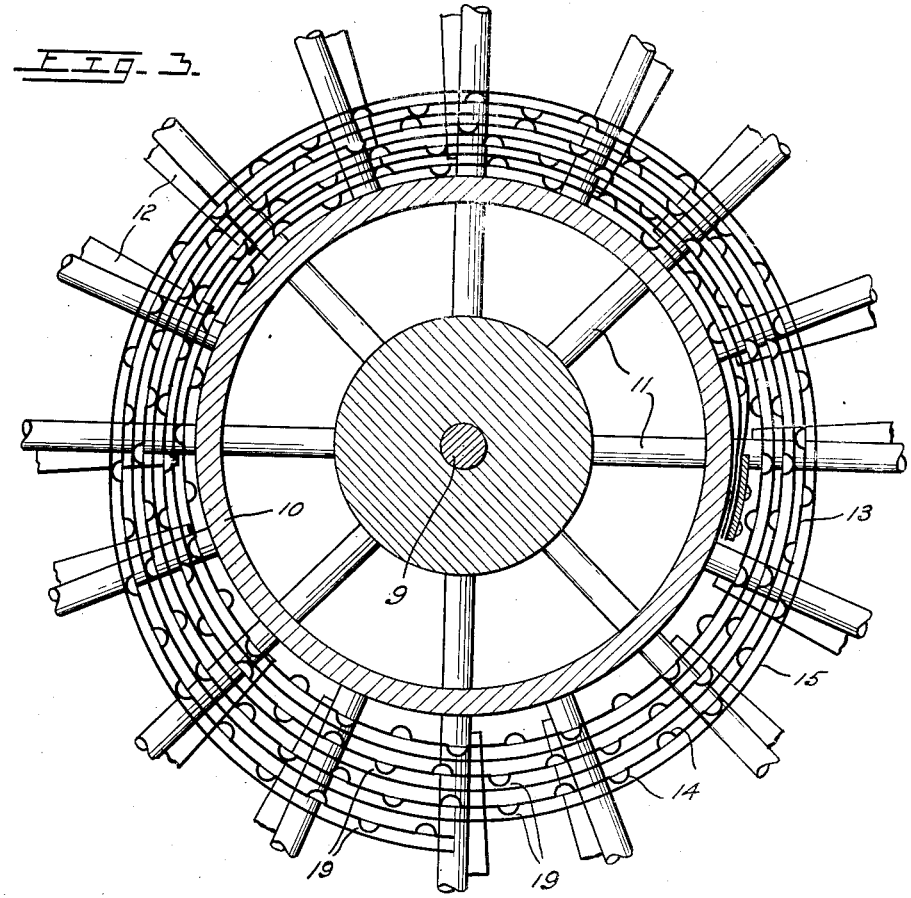
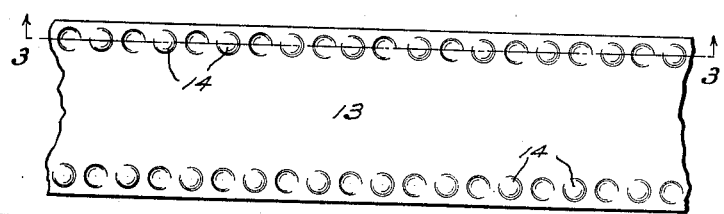
Inventors;
LeRoy C. Davidge, and
Arthur E. Reeves,
per Arthur J. Farnsworth
their Attorney.

Patented Feb. 2, 1932

1,843,317

UNITED STATES PATENT OFFICE

LE ROY C. DAVIDGE AND ARTHUR E. REEVES, OF LOS ANGELES, CALIFORNIA; SAID REEVES ASSIGNOR TO SAID DAVIDGE

FILM DEVELOPING PROCESS AND APPARATUS THEREFOR

Application filed January 23, 1929. Serial No. 334,438.

In this specification, and the accompanying drawings we shall describe and show a preferred form of our invention, and specifically mention certain of its more important objects. We do not limit ourselves to forms disclosed, since various changes and adaptations may be made therein without departing from the essence of our invention as hereinafter claimed, and objects and advantages, other than those specifically mentioned, are included within its scope.

Our invention relates to means for developing motion picture films and to similar processes, and also to apparatus therefor. Its principal objects include; first, to provide means for reeling a motion picture film very compactly, but with its contiguous surfaces spaced to allow ingress and egress of liquid therebetween; second, to furnish facilities for circulating developing or other fluid between the contiguous layers of a film so reeled, while the reel is being rotated about a horizontal axis; third, to supply a method whereby the direction of flow of liquid between the layers of a thus reeled film may be automatically reversed by reversing the direction of rotation of the reel; fourth, to afford improved means for separating adjacent layers of a reeled film to permit liquid to circulate therebetween; and, fifth, to accomplish the above by means of relatively simple and inexpensive apparatus particularly well fitted for the above purposes.

The above and other objects are attained in the manner illustrated in the accompanying drawings in which—

Figure 1 is a sectional elevation of a developing tank of our improved construction, containing, in operative position, a motion picture film wound with spaced layers upon a special reel embodying further features of our invention;

Figure 2 is a plan view of the above apparatus;

Figure 3 is a diagrammatic fragmentary sectional elevation on an enlarged scale, of a portion of the reel and film shown in Fig. 1; and illustrating in detail the means employed by us for spacing contiguous layers of the reeled film; and, Figure 4 is a plan view of a fragmentary portion of the improved separating strip that we employ for the purpose of spacing contiguous layers of the reeled film.

The section of Fig. 1 is taken on the plane of 1—1 of Fig. 2; and the section of Fig. 3 is taken on a plane corresponding to the line 3—3 of Fig. 4.

Similar reference numerals refer to similar parts throughout the several views.

Since the advent of talking motion pictures, it has been found advisable to greatly increase the length of the films, even in the ratio of 4 to 1 or more. Such films are proportionately heavier and, when reeled with spaced layers, occupy much greater space than the shorter films required. This has increased the difficulty of handling, and of securing uniform development, of reeled films. The principal difficulties are to secure developments that are free from streaks, and from un-developed or under-developed areas resulting from air bubbles or the like. In the case of the shorter films it was possible and practical to secure fairly satisfactory results in development by emersing the space-reeled films in a developing bath with their axes vertical, and moving the reels up and down in the bath to secure circulation of the developing fluid between the layers of the coil. In this method of treatment however the development was apt to be streaky and apt to contain un-developed or under-developed areas.

We have discovered that uniformity of development can best be secured when the developing bath is kept in constant agitation and is rapidly circulated between the layers of the coiled film while the latter is being rotated; and especially when the flow direction of the liquid through the film, and also the direction of rotation of the film is reversed at substantially uniform intervals. It is however very difficult and usually impractical to accomplish these results when the axis of the reeled film is vertical. We therefore employ a developing process wherein the axis of the reeled film is horizontal.

Passing to a detailed description of our process, and referring to the particular embodiments of the elements of our apparatus that have been selected for illustration, we have shown a semi-cylindrical developing tank at 5, its axis being horizontal and its axial dimension being relatively small as compared with its diameter. Within the tank near its bottom, are spaced flanged rollers 6, adapted to rotate about horizontal axes, and provided with shafts 7 extending through stuffing boxes (not shown) in the side of the tank. These rollers are adapted to support and position a circular reel resting thereupon, and are adapted to rotate the reel when one or both of them are revolved. Thus shafts 7 may be geared together and driven from a convenient source of power, such as an electric motor. The drive should be so arranged that the direction of rotation of the rollers may be reversed at frequent and approximately equal intervals.

Our preferred form of developing reel comprises two opposed spaced wheels 8, mounted upon a common shaft 9. These wheels are connected by a concentric drum 10 upon which the film is wound. The wheels are spoked as shown at 11, and the outer portion of each spoke is provided with an impeller blade 12 extending outwardly at an angle away from the plane of its wheel. Alternate blades of each wheel extend therefrom at opposite angles, and the blades upon corresponding spokes of the two wheels are parallel and lie in substantially the same plane.

For spacing contiguous layers of the coiled film to be developed, we employ a spacing strip 13 of celluloid therebetween. This spacing strip is embossed in such a manner that spaced dome-shaped protuberances 14 project from each of its surfaces, adjacent each of its edges.

In making practical application of our invention, the film 15 that is to be developed, and the spacing strip 13, are wound together upon drum 10 of the reel under slight tension, the plane of the reel at the time being horizontal and its axis vertical. The outer ends of the two film strips are properly secured to the spokes of the reel or otherwise, to prevent unreeling. The reel with its thus-coiled films is then placed in developing tank 5 in the manner shown in Fig. 1, the axis of the reel being horizontal and the lower half thereof being submerged in developing liquid 16. The weight of the reel and film is allowed to rest upon rollers 6, and the reel is given a rapid rotary movement by hand or by power applied through shafts 7. After a brief pre-determined interval the direction of rotation of the reel is reversed for approximately the same duration of time, and so on until the development of the film is completed. The reel with its film is then lifted from the developing tank and placed in a similar tank containing a bath of water or other liquid for stopping the development, and is similarly rotated therein. The reel is then lifted from the second tank and placed in a similar tank containing fixing solution and is similarly rotated therein. Finally the reel is placed in a similar washing tank and rotated therein to complete the developing process.

While the reel is being rotated in any of the tanks, as in the direction of arrow 17 of Fig. 2, the impeller blades 12 force the liquid between the interstices of the films as shown by the arrows 18. By reason of the alternately directed impeller blades, the direction of liquid flow between the layers of the coil film will be reversed when the direction of rotation of the reel is reversed. The impeller blades force the liquid rapidly between the leaves of the film and also serve to powerfully agitate the liquid of the tank to maintain its homogeneity. The frequent reversal of the flow direction, which is also accompanied by reversal of direction of rotation of the reel, serves to secure a very uniform development of the film, free from both streaks and undeveloped or under-developed areas.

It was mentioned above that the film strips are wound upon the reel under slight tension, while the axis of the reel is vertical and its plane horizontal. When the thus wound reel is placed in the tanks, with its axis horizontal, gravity will cause the upper layers of the films to be pressed together as tightly as possible, although they will remain spaced; and the lower layers of the films will sag slightly, so as to increase their spacing. This effect is clearly indicated in Fig. 3 at 19. The lower layers of the coils under such conditions do not in fact come into contact except at a few widely spaced points. These points are constantly changing their positions, due to the rotation of the reel, since rotating the reel in one direction tends to tighten the coil windings, and rotation in the other direction tends to loosen them. The coils do not unwind of course, since their ends are attached to the reel; but the intermediate portions of the coils act in the way described. This action, since it takes place in the lower half of the coils, and therefore within the developing bath, has the effect of freely exposing practically every portion of the film surface to the action of the bath. There are very few points of contact between adjacent layers of the coils, and the position of these contacts is constantly changing. This action therefore strongly tends to further secure uniformity and good quality of development, and cannot be secured with tightly wound films, or those that are developed with the plane of the coil horizontal.

Reel shaft 9 is made of a length that is almost, but not quite, equal to the axial dimension of tank 5; and the action of this shaft, and of flanged rollers 6, serves to keep the plane of the reel vertical and spaced from the inner walls of the tank. A pair of angle irons 20, converging downwardly at the center of each side of the tank, serve to guide shaft 9 to its proper position when it is being lowered into the tank; but these angle irons do not need ordinarily to exert any further function, although they serve to keep the reel from becoming accidently displaced.

From the foregoing description it will be apparent that we have succeeded in originating a process for developing a coiled film in a rapid and economical manner; and one that is capable of securing the best obtainable results. It will also be obvious that the apparatus we have devised for accomplishing the process is very simple, compact, and relatively inexpensive.

Having thus fully described our invention in a manner that will enable it to be fully utilized by those familiar with the art involved, we claim:

1. A film developing process which comprises; mounting a film upon a reel in spaced spiral layers; partially immersing the thus mounted film and the reel in a bath of liquid; and forcing said liquid to flow between the spiral layers of the film transversely from one side of the film coil to the other, while revolving the reel.

2. A film developing process which comprises; mounting a film upon a reel in spaced spiral layers; partially immersing the thus mounted film and the reel in a bath of liquid; and forcing said liquid to flow between the spiral layers of the film transversely in alternately opposite directions, from one side of the film coil to the other while revolving the reel.

3. A film developing process which comprises mounting a film upon a reel in spaced spiral layers; partially immersing the thus mounted film and the reel in a bath of liquid; and forcing said liquid to flow between the spiral layers of the film transversely from one side of the film coil to the other, while revolving the reel; the direction of flow through the interstices of the film, and also the direction of rotation of the reel, being periodically reversed for approximately equal intervals.

4. A film developing process which comprises; mounting a film upon a reel in spaced spiral layers; partially immersing the thus mounted film and the reel in a bath of liquid; and forcing said liquid to flow rapidly between the spiral layers of the film transversely, from one side of the film coil to the other, while revolving the reel and strongly agitating the bath.

5. A film developing process which comprises; winding a film under slight tension upon a reel, with a strip having protuberances on each side thereof, interposed between the layers of the film, the axis of the reel being vertical during said winding; partially immersing the thus wound film in a bath of liquid with the axis of the reel horizontal; and forcing said liquid transversely, from one side of the film coil to the other, through the interstices of the thus wound film while revolving the reel; the initial winding tension of the film being such that, when the axis of the reel is horizontal, the lower layers of the film will sag by gravity, and thus become more widely spaced.

6. In combination; a tank adapted to contain liquid; spaced rollers within the tank near its bottom, adapted to rotate about horizontal axes; and a reel comprising spaced co-axial wheels adapted to be rotatably supported in the tank by said rollers; said reel having impeller blades adapted to circulate said liquid through the space between its wheels.

7. In combination; a tank adapted to contain liquid; spaced rollers within the tank near its bottom, adapted to rotate about horizontal axes; a reel comprising spaced co-axial wheels adapted to be rotatably supported in the tank by said rollers; and means external to the tank whereby the rollers may be revolved to rotate the reel when resting upon them; said reel having impeller blades adapted to circulate said liquid through the space between its wheels when it is rotated in either direction.

8. In combination; a tank adapted to contain liquid; a rotatable reel within the tank; a film mounted upon the reel in spiral layers spaced by an interposed strip having a continuous series of spaced protuberances adjacent each edge on each side of the strip; and means comprising the revolution of the reel for forcing said liquid to flow between the spiral layers of the film, from one side of the film coil to the other.

9. In combination; a tank adapted to contain liquid; a rotatable spoked reel within the tank; a film mounted upon the reel in spaced spiral layers; and impeller blades upon the spokes of the reel, adapted for forcing said liquid to flow transversely to the film, through its spiral spaces, when the reel is revolved.

10. In combination; a tank adapted to contain liquid; spaced spoked wheels affixed to a common rotatable shaft, within the tank; a film mounted between said wheels in spaced spiral layers; and impeller blades upon the spokes of each wheel, adapted for forcing said liquid to flow, transversely to the film through its spiral spaces, when said shaft is revolved; the impeller blades of each wheel being inclined alternately in opposite directions, and in the same direction as that of substantially opposite blades on the other wheel.

LE ROY C. DAVIDGE.
ARTHUR E. REEVES.